June 21, 1966  J. D. PERDUE  3,256,773
PSEUDO THREE DIMENSION DISPLAY
Filed Sept. 1, 1964  2 Sheets-Sheet 1
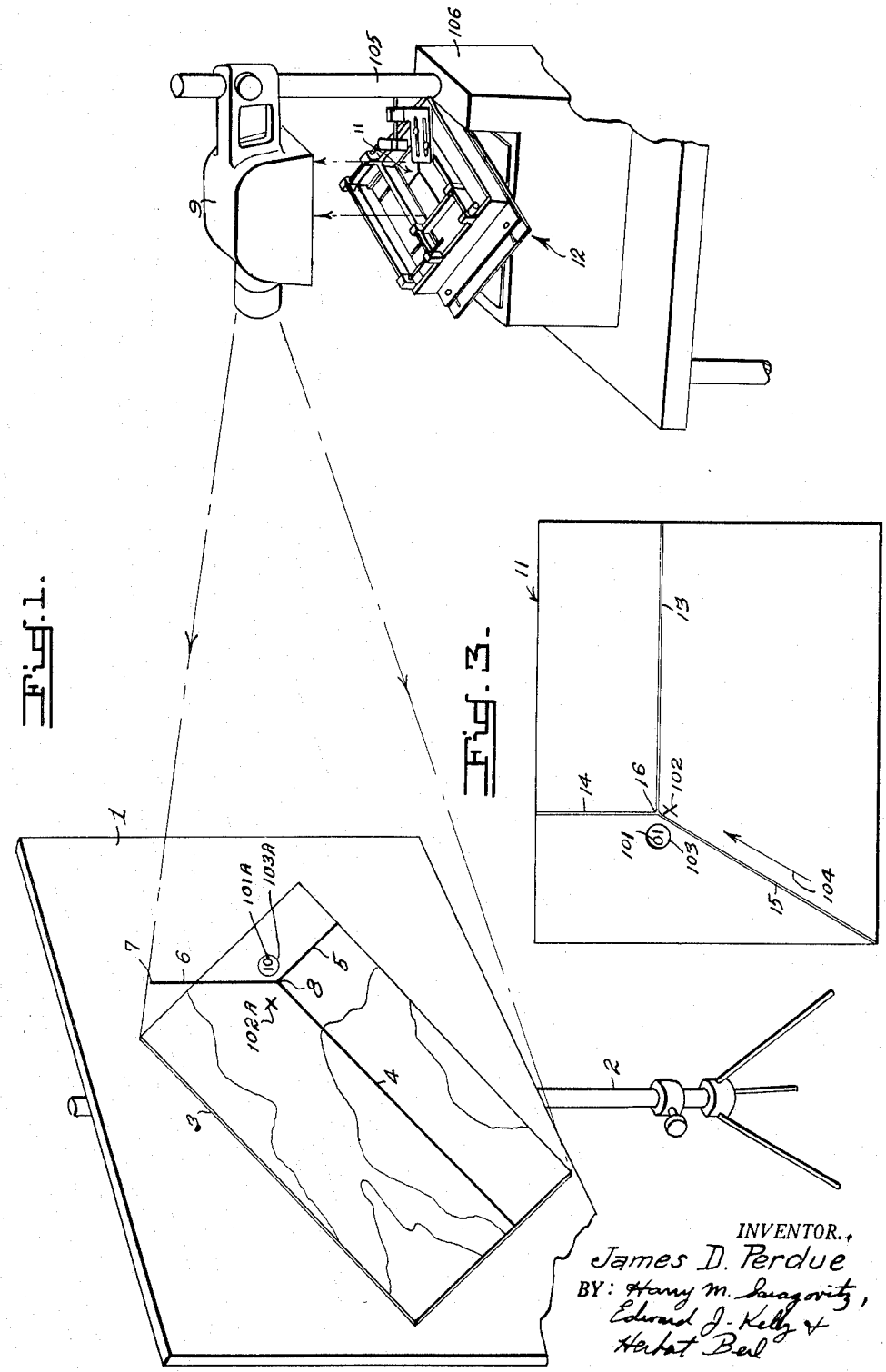
INVENTOR.
James D. Perdue
BY: Harry M. Saragovitz,
Edward J. Kelly &
Herbert Berl

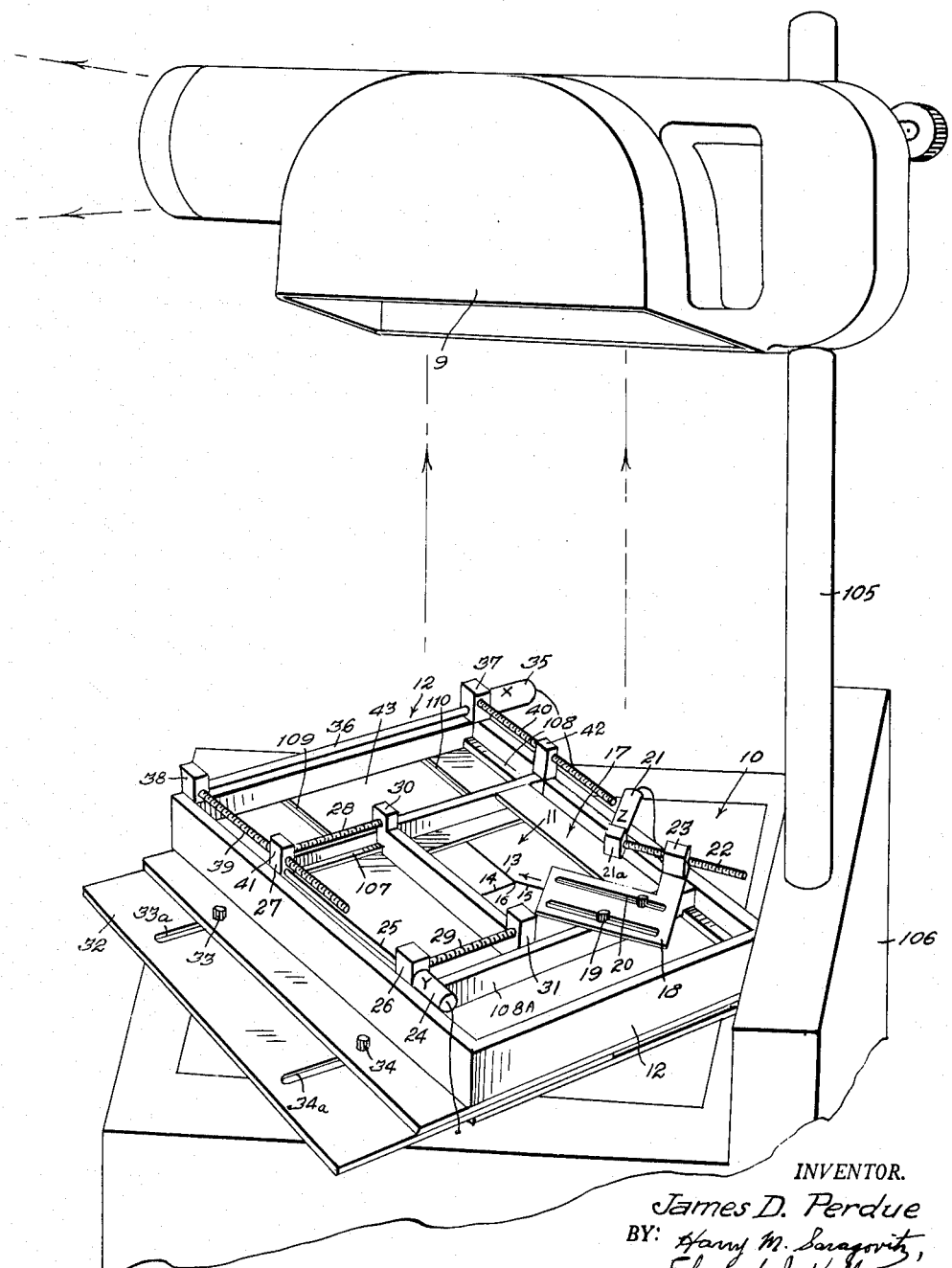

United States Patent Office 3,256,773
Patented June 21, 1966

3,256,773
PSEUDO THREE DIMENSION DISPLAY
James D. Perdue, Las Cruces, N. Mex., assignor to the United States of America as represented by the Secretary of the Army
Filed Sept. 1, 1964, Ser. No. 393,795
9 Claims. (Cl. 88—24)

The invention described herein may be manufactured and used by or for the Government for governmental purposes, without the payment to me of any royalty thereon.

This invention relates to a pseudo three-dimension display and more particularly to a device for providing a visual indication of the position of missiles, aircraft and the like by projecting onto a map, typically, two intersecting perpendicular lines and a third line, vertical, and oblique to the other two at their junction. The point of intersection of the three lines establishes the position of the object of interest with respect to the area depicted on the map; and the vertical line, giving the illusion of being perpendicular to the map's surface, represents by its length the altitude of the object.

Three-dimensional displays are commonly thought to be useful for target vectoring, aircraft controllers, range safety, observing intercept of missile and a target, or observing the relative positions of the individual items in a cluster of closely spaced objects.

In these usages there are two fundamental needs: first, position data and second, intuitive comprehension of the relative position of objects and reference coordinates. The position data must be accurate and not subject to misinterpretation. The intuitive comprehension of spatial relationships must be instantaneous and unambiguous.

A true three-dimensional display completely simulates the visual spatial situation with all of its problems. Spatial perception is a complicated and deceptive process. Stereovision, perspective, environmental effects such as lighting and haze, all play a part therein. Optical illusions occur and are hardly the proper foundations for decisions of safety officers, aircraft controllers and others using the display.

There are at least six important requirements which must be met by a test-range display designed for visual presentation of three dimensional position data.

(1) An acceptable display must be capable of providing precision position information and must not be subject to misinterpretation based on improper evaluation of relative angles or distances. In short, the display must not depend on perspective.

(2) The display must not encumber the user with special viewing devices or gadgets. Thus all common stereo or binocular displays are ruled out.

(3) An observer of the display must see the full situation without moving from a fixed position. This rules out the realism of spatial or volume type displays.

(4) The display must be observable simultaneously by several viewers, each of whom will see exactly the same thing. There can be no parallax to cause varying interpretations. This rules out the realism of true three-dimension displays.

(5) The display must give to the observer an intuitive feeling for the spatial relationships involved. Thus dual two-dimensional displays are inadequate.

(6) The display must enable the operator to change scale and back-ground maps at will.

The present invention is designed to fulfill all of the aforesaid requirements by providing a novel pseudo three-dimensional display giving the illusion of spatial reality to the viewer.

It is therefore a primary object of this invention to provide a pseudo three-dimensional display which may be operated from a digital data system, an analog data system or even by hand operation.

Another object is to provide visual tracking of an object by projecting two perpendicular lines and a variable length vertical line onto a map on a screen whereby the vertical line appears to be perpendicular to the map to give the illusion of altitude.

Another object is to provide a pseudo three-dimensional display utilizing neither perspective nor stereovision to give an illusion of three-dimension and to provide the observers thereof with a realistic perception of relative space positions of a missile, or the like, in flight over terrain.

A further object of the invention is to provide an inexpensive and efficient pseudo three-dimensional display.

The specific nature of the invention as well as other objects and advantages thereof, will clearly appear from a description of a preferred embodiment as shown in the accompanying drawings, in which:

FIG. 1 is a somewhat schematic perspective view of the pseudo three-dimensional display of the invention as projected upon a viewing screen;

FIG. 2 is a perspective view, on a larger scale than FIG. 1 and showing one embodiment of the projecting apparatus; and FIG. 3 is a view of the projector plate used in producing the display of the invention.

Referring to the drawings, FIG. 1 shows the apparatus for projecting the display onto a screen designated by reference character 1 which is supported by a stand 2. A scale map 3, of the area of interest, is placed on screen 1.

Map 3 will preferably be projected onto the screen from an auxiliary projector, not shown. This projector will preferably be of the random access type and contain an appropriate supply of slides of maps of the various geographical areas, having relative scales such as may be needed for the next use of the pseudo three-dimension display. Screen 1 will preferably be a translucent dual purpose screen designed for simultaneously displaying a composite image projected partially from a projector in the rear and partially from a projector in front of the screen, thus eliminating keystoning problems. However, under certain conditions it may be desirable to have both the pseudo three-dimensional and the random access background projector on the same side of the screen.

Alternatively, if only one background map is required or when map changes do not need to take place rapidly, the map, 3, may be secured to screen, 1, by any convenient means such as tape, staples, thumb-tacks etc. or even printed or painted on screen 1.

Map 3 will be positioned on screen, 1, in such a manner that one lower corner, for example the southeast, approximately touches the bottom of the screen and so that the right hand boundary of map 3, or a predetermined reference line on the map, normally running in a north and south direction and normally near its eastern boundary, is at an acute angle, normally 30°, with the bottom of screen 1.

Three lines 4, 5 and 6 are superimposed on the map by a projection apparatus to be described later.

These lines are preferably, in color. Two are, preferably blue or green while the third one is preferably red.

Also projected on the map and determined by lines 4, 5 and 6 are points 7 and 8.

Lines 4, 5 and 6 and points 7 and 8 will constitute the heart of the single object display when properly orientated with respect to the desired area on the map 1. The length of line 4 represents the North-South distance of an object of interest from a reference line. The reference line is ordinarily the South end of the map or the southern reference coordinate. Similarly the length of line 5 represents the East-West distance of the object of interest from a reference line which is, ordinarily, the East edge of the map or the eastern reference coordinate. Thus point 8 (ground point) is the point on the map 1 which designates the position directly underneath the object of interest, such as a missile, etc. Line 6 will have the same scale-factor as the map and lines 4 and 5, or an integral multiple or submultiple of this scale-factor and if the scale-factors are not the same then the multiplier will be displayed (101A) alongside of line 6. Hence the length of line 6, taking into account the proper scale-factor, will represent the height of the object of interest above ground point 8.

The top 7 of line 6 thus represents, and gives a pseudo three-dimensional picture of, the position in space of the object of interest and is the "space point." The scale may be indicated on line 6 as shown in FIG. 1 and may be applied directly on the line 6 or projected on the map.

Since the object-of-interest is ordinarily in motion, i.e. a missile, plane, etc., the device which produces or projects lines 4, 5 and 6 onto screen 1 must be so controlled that, at all times during the flight, point 8 designates the point over which the object is at that time. Point 7 properly represents the space point at that time. Line 6 always remains perpendicular to the bottom of the screen 1. Lines 4 and 5 always remain parallel to the appropriate boundaries, normally East and South, of the map 1 respectively and are always terminated at the appropriate reference lines (usually the map's South and East boundaries) respectively.

This is accomplished by apparatus consisting essentially of a horizontal platform or "over the shoulder" type of projector. The projector head 9 is adjustably mounted on a standard 105 fixed on a frame 106 in which a light (not shown) is contained. The light emitting area is indicated as at 10.

A projector plate 11 containing the markings to be projected on the screen 1 is carried by a plate carriage assembly 12. (The carriage assembly 12 is shown schematically in FIG. 1 and more in detail in FIG. 2.)

The plate 11 is opaque except for lines 13, 14 and 15 and optical scaling symbols 102 and 103. The projected image of line 13 on map 3 is designated as 4, line 14 as 5 and line 15 as 6. The images of the optical scaling symbols 102 and 103 are indicated as 102A and 103A on map 3. Lines 13 and 14 form a 90° angle while lines 14 and 15 normally form an angle of 150°. (The supplement of the angle between the map and the screen.)

An arrow (not transparent) 104 is shown on plate 11 along line 15 (see FIG. 3) and is for the purpose of the operator in placing plate 11 in the proper position in carriage assembly 12. It will be pointed directly at screen 1 when in its proper position therein.

Lines 13, 14 and 15 and items 102 and 103 are transparent. Lines 13 and 14 are preferably, green or blue and line 15 is preferably, red. Item 103 is a transparent circle so that a number, 101, representing scale-factor for line 6 can be inserted therein for projection onto map 3. Point 16 produces point 8 (ground point) on the screen.

When lines 13, 14 and 15 are projected on map 3, an illusion of three dimensions will be presented to the observer.

FIG. 2 illustrates in detail a manner of moving and masking plate 11 by the carriage assembly indicated generally by 12, so that the lines 13, 14 and 15 may be appropriately projected onto map 3.

Opaque slide 18 is moved linearly with respect to line 15 on plate 11 by "Z" coordinate motor 21 which through a right angle gear drive 21a rotates lead screw 22 which, in turn, drives an internally threaded collar 23 fixed to slide 18. Guides 19 and 20 prevent skewing of the slide 18.

Plate 11 together with slide 18, motor 21 and slide drive mechanism 21a, 22 and 23, all ride on a primary carriage, indicated generally by 17 which rides on track 107. (Another track, not shown may be provided for the other end of carriage 17.)

A "Y" coordinate motor 24 functions, through a drive shaft 25 supported in bearings 26 and 27, to rotate lead screws 28 and 29 which are threaded in internally threaded collars 30 and 31 rigidly fixed to carriage 17, and causes carriage 17 to move a predetermined distance, parallel to the direction of line 14 on plate 11. Ground point 8 on map 3 (FIG. 1) can thus be caused to move to any desired distance thereon from the lower right hand, normally the Eastern, reference line of the map. In other words, the length of line 5 on map 3 can be adjusted by proper operation of "Y" coordinate motor 24 to any length from zero to the full width of the map. It will be noted that in event the object of interest moves, so that ground point 8 tends to go off the map, the operator may normally select from the auxiliary random access projector, a map corresponding to the changing trajectory of the object of interest.

Primary carriage 17 (carrying plate 11), together with rails 107 (one not being shown), motor 24, structures 26 and 27, and shafts 25, 28 and 29 and the necessary supporting framework constitute a secondary carriage 108A. This secondary carriage, 108A, is movable in a direction parallel to line 13 on plate 11 in such a manner that point 8 on map 3 may be positioned in a normally North-South direction anywhere between the lower left hand, normally Southern reference line and the opposite, normally Northern, end of the map. In other words, the length of line 4 on map 3 may be controlled to be any distance from zero to the full length of the map.

The motion of the secondary carriage is along a pair of tracks 108 (one only being shown) and is determined by X coordinate motor 35 which drives main drive shaft 36 supported in bearing housings 37 and 38. Housing 38 contains a right angle drive (not shown) which imparts rotation to lead screw 39, while a right angle drive (not shown) in housing 37 rotates a lead screw 40. Lead screws 39 and 40 mesh with internally threaded structures 41 and 42 rigidly fixed to the frame of the secondary carriage. (Note that structure 27 and 41 is internally threaded for actuating secondary carriage by lead screw 39, is also end bearing of shafts 25 and 28 and contains right angle drive for driving 28 from 25.)

The lower right hand reference line on the map, normally the eastern boundary, must establish the reference termination of line 5 (on map 3) at the end opposite point 8. This requires an adjustable mask 32 which can be moved back and forth by hand when setting up the projector before use and can be so positioned that the projection of its innermost edge will determine the desired reference line along, or parallel to, the edge of map 3. As special plate 11 is moved to various positions by primary carriage 17 and secondary carriage 108A the reference end of line 5 on map 3 will always be determined by the position of mask 32, normally at or near the eastern boundary of the map and along a line running due north and south on, or near the edge of, the map. Mask 32 is normally positioned between secondary carriage 108A and projector light window 10 before plate 11 is put in place. After plate 11 is placed on the primary carriage 17, line 14 on plate 11 will always be partially masked at its extreme end by mask 32, thus determining the terminus and length of line 5 on map 3.

After mask 32 is properly adjusted it is locked in place with locking devices 33 and 34 which ride in parallel inverted-V-grooves 33a and 34a. These V-grooves are in, or in material attached to, mask 32 but do not completely penetrate mask 32.

Another sliding mask 43 has the same function with respect to establishing the normally, South reference line for line 4 on the map as mask 32 has with respect to the, normally, Eastern reference line for line 5 on map 3. Its nearer edge slides underneath the secondary carriage 108A, and hence also under primary carriage 17 and plate 11. Thus its nearer edge masks the farther part of line 13 and so determines the lower, normally, Southern end of line 4 (on map 3).

When preparing the display for projection on screen 1, mask 43 is adjusted by the operator so that it correctly defines the lower, normally Southern, reference on map 3 with its edge parallel with line 14 (on plate 11).

Mask 43 is similar to mask 32 and similar locking devices (not shown) lock in parallel grooves 109 and 110.

If the lighting area 10 is a large area it may not be completely covered by carriage assembly 17 and masks 32 and 43, and unwanted portions of light will be admitted therethrough and interfere with proper projection of the display. These portions may be masked off by a suitable opaque material (not shown).

Flexible shields, not shown, will preferably be employed between the sides of primary carriage 17 and the adjacent sides of secondary carriage 108A and between the ends of secondary carriage 108A and the frame 12. Flexible or rigid shields may be also employed, outside of frame 12, if required to close lighting area 10. All necessary masking is required in order that the light reaching screen 1 comes through only the lines and markings in plate 11.

Motors X(35), Y(24) and Z(21) will be controlled by conventional circuitry from the outputs of a range tracking system. (Not shown.) Normally the X, Y and Z inputs to the associated circuitry will be digital and in terms of the range coordinate system.

Conventional digital interface circuitry will transform the X and Y range coordinates to conform to the reference lines established on the display map. Appropriate digital scaling will be accomplished and the translated and scaled digital information used to control the three motors. The motors will normally be reversible stepping motors readily used with digital control. Other types of small motors may be used however and if appropriate, the display may be adapted to analog or even manual data inputs.

Prior to each display use, associated with an object of interest such as a missile firing, the operator will adjust the carriage assembly 12 (primary carriage 17 and secondary carriage 108A) to place point 16 (on plate 11) so that when projected, its image 8 (on map 3) is at the launcher position of the missile. Slide 18 will be adjusted so that it covers all of line 15 (on plate 11). Thus line 6 (on map 3) does not show. As the missile (object of interest) is fired and proceeds on its trajectory, the incoming X, Y and Z coordinate information will, after translation, so control the three motors 35, 24 and 21, that point 8 (on map 3) will continuously be at that point on map 3 which indicates the instantaneous point below the missile and point 7 (on map 3) will continuously indicate the space position of the missile, in terms of the instantaneous length of line 6 (on map 3) representing the elevation, when line 6 is correctly interpreted with the then applicable scale-factor 101A.

If it is desired to represent two or three objects of interest on the display, two or more projectors, each equipped with carriage assemblies 12 and each fed with the appropriate X, Y and Z information may be used. With two or more properly placed projectors, keystone effects will not be appreciable. Different colors would preferably be used on the different projectors for the transparent lines 13, 14 and 15 on plate 11. One projector would have preferably a plate using blue and red lines, another perhaps green and yellow, and maybe a third, orange and white.

It is obvious that a variant of the display of this invention, if more than one object of interest is to be shown, is to eliminate lines 4 and 5 and use only line 6. Likewise, lines 13 and 14 would be omitted from plate 11. This method has the advantage of indicating the ground point 8 and space point 7 with only one line, 6. However, this method does not give the viewer as complete a feeling of spatial reality as when all three lines are used.

For use with those range functions requiring a maximum of spatial feel for object position combined with precise position data, it is planned to project the X, Y and Z digital information onto the screen, with the three data numbers appropriately placed about point 8. This may be accomplished in any expedient way. One method would be to use a projection type charactron tube (not shown) on a swivel mount continuously pointed at point 8. The tube pointing could be controlled by a mechanical connection to, or by electrical servoing to, primary carriage 17. Input of digital information to the tube would be handled with conventional digital circuitry.

For most displays, map 3 will be marked with appropriately scaled coordinate lines, or lines 13, 14 and 15 will carry short cross lines at appropriate scale intervals. These cross lines may be every ten miles, every mile, or at any appropriate interval depending upon the scale of the background map then in use.

As the operator selects from the random access projector various background map slides of different scale he will also manually or automatically cause a corresponding difference in the scale factoring circuits.

Variations and modifications may be effected without departing from the scope of the novel concept of the present invention as set forth in the appended claims.

What is claimed is:

1. A pseudo three-dimension display for the visual tracking of an object in flight including in combination a projection screen, a map on said screen, a source of light, a carriage assembly disposed over said source of light, an opaque plate adjustably mounted in said carriage, there being a plurality of transparent lines on said plate, said plate adapted to be moved with respect to said map by said carriage, adjustable means carried by said carriage for masking one of said transparent lines and a projection head mounted over said plate for projecting light rays, emanating from said source of light and through said transparent lines, onto said map whereby the image of said lines will represent the position of the object with respect to said map and will create an illusion of three dimensions with respect to said map when said display is viewed.

2. A pseudo three-dimension display as claimed in claim 1 wherein said map is placed on said projection screen whereby one of its reference axes is disposed at an angle of approximately 30 degrees with respect to the bottom of said screen to cause said third transparent line to appear perpendicular to said map.

3. A pseudo three-dimension display as claimed in claim 1 wherein the first and second of said transparent lines form an angle of 90 degrees with each other and by the position of their intersection with respect to boundary determining masks establish the X and Y coordinates of the position of said object with respect to said map and said third line forms an oblique angle which is the supplement of one of the acute angles which the map reference lines make with the horizontal and by its effective length establishes the altitude position of said object.

4. A pseudo three-dimension display as claimed in claim 3 wherein said first and second transparent lines are of the same color and said third transparent line is of another color.

5. A pseudo three-dimension display as claimed in claim 1 wherein said carriage assembly comprises a frame, a primary carriage mounted for linear movement within said frame and a secondary carriage mounted for linear movement within said frame, said linear movement of said secondary carriage being normal to said linear movement of said primary carriage, said primary carriage being carried by said secondary carriage whereby said plate may be moved through horizontal and vertical directions to orient said transparent lines with respect to said map.

6. A pseudo three-dimension display as claimed in claim 1 wherein said adjustable means for masking said third line comprises an opaque device mounted over said third line whereby it may be adjusted along the length thereof, the exposed portion of said line indicating the altitude of said object in flight.

7. A pseudo three-dimensional display as claimed in claim 3 wherein the first and second transparent lines are covered by a blue filter and form blue images on the screen and the third transparent line is covered by a red filter and forms a red image on the screen.

8. A pseudo three-dimensional display as claimed in claim 3 wherein one or more of the transparent lines are covered by chromatic filters.

9. A pseudo three-dimensional display as claimed in claim 3 wherein the said opaque plate with the said plurality of transparent lines also contains a transparent opening over which may be placed, as appropriate, an overlay containing a symbol the projection of which on said screen will be the scale factor relating the effective vertical scale of the said third line to the effective horizontal scale of the said first and second lines.

No references cited.

NORTON ANSHER, *Primary Examiner.*